Dec. 7, 1965 D. R. DUSTIN 3,222,603

FIRST BIT GENERATOR FOR BINARY TAPE SYSTEMS

Filed Oct. 30, 1962 3 Sheets-Sheet 1

INVENTOR
DONALD R. DUSTIN
BY Bernard M. Goldman
ATTORNEY

United States Patent Office 3,222,603

Patented Dec. 7, 1965

3,222,603
FIRST BIT GENERATOR FOR BINARY TAPE SYSTEMS

Donald Robert Dustin, Salt Point, N.Y., assignor to International Business Machines Corporation, New York, N.Y., a corporation of New York Filed Oct. 30, 1962, Ser. No. 234,151
11 Claims. (Cl. 328—59)

This invention relates generally to means for increasing the reliability of a data transfer, and particularly to increasing the reliability in transferring a block of binary data bytes.

A byte in this specification is a group of bits transmitted in parallel by a plurality of carrier frequencies or a plurality of transmission lines. A byte may be a character with parity, or a part of a large binary word, etc.

This invention is particularly useful for increasing the reliability of binary data transferred from magnetic tape. For example, it is common to record data on tape using NRZI recording techniques where the bits of a byte are recorded in parallel channels on the tape. In NRZI recording a "1" bit is represented by a flux reversal on tape and a "0" bit by no flux reversal (or vice-versa). It is also common to record such bits at any of many densities, such as 800 bits per inch in any track. At times during the life of a tape, the signal of some bit may be sensed with insufficient amplitude due to splices, scratches or minute particles of oxide, which have become imbedded in the surface of the magnetic tape to shim the head away from that particular spot on the tape. This signal loss is commonly referred to as "dropout," which is defined as a condition in which the sensed amplitude of a "1" bit is insufficient to actuate a register primarily intended to receive the bit. If there is a dropout of every "1" bit of a byte, the fact that a byte existed is lost.

A presently allowed patent application (assigned to the same assignee as the present application) having Serial No. 671,834, filed July 15, 1957, now Patent 3,078,448 titled, "Dual-Channel Sensing," by Hugh O'Brien describes a system for increasing the reliability of bits sensed with marginal amplitude. The system of that application is preliminary to the present invention, and the subject matter of that application is included in this specification by reference. In that patent application, two separate "sensing units" are provided. They are connected in parallel with respect to lines transmitting the information from different tracks recorded on magnetic tape. The output of a "high-clip" sensing unit is provided to a register, called herein the "high register." Likewise, the output of a "low-clip" sensing unit is provided to another register, called herein a "low register." When all information on the tape is properly sensed by respective heads to provide high amplitude bits, the bytes sensed from tape should be identically registered in the high and low registers. However, when the amplitude of a bit sensed from tape becomes marginal, the bit will actuate the "low register" but not the "high register." Under such marginal circumstances, the "low register" output is more reliable; although under normal high amplitude conditions, the "high-register" is more reliable because the "low register" is more prone to actuation by noise pulses passed by the lower clipping level. A vertical redundancy check circuit is used with "high register," so that upon an error indication the "low register" is read out on the probable assumption that it was more likely to be accurate under the circumstances. Later, the "low register" output is parity checked.

The above cited application also describes a circuit that compares the respective bits in the "high register" and "low register" to see if they matched (compared). The bit match was used as an error check only during read-while-write, wherein a read head followed shortly behind a write head that was writing a record on tape. The bits of the read head in this case were simultaneously provided to the high and low registers and compared. If under any circumstances there was not a perfect match (which indicated marginal amplitude) the data block was rewritten to assure an initial reading with all bits having high amplitude. The match check (byte compare) supplemented the parity check during the write operation by being able to catch errors not found by the parity check.

However, under this prior system the information was transferred from the high or low register, as the case may be, to an output register by a timed sampling pulse called a "character gate." The "character gate" is a sampling pulse or series of pulses derived from a delay device actuated by the first bit of a byte received by the "high register." While only reading tape, the "low register" was not used to actuate any "character gate," because of the "low register's" proneness to actuation by received noise, due to the lower clipping level used for its input. (It was not uncommon for a noise pulse to pass through the low-clip circuit and actuate the "low register," although the noise pulse would not pass through the higher clipping level to the "high register.") Hence if the "low register" were always as available as the "high register" to generate a "character gate," noise pulses could actuate "character gates" that would cause the system to think it was receiving bytes (characters) when none was intended; this would have reduced the reliability of the system. Accordingly, the prior system was restricted to utilizing only the "high register" for character gating purposes while reading (but not writing) tape.

As long as there were more than two bits in each byte, the loss of one of the two bits in the "high reigster" would not affect the "character gate" actuation (in which case the byte in the "low register" was transferred instead because of a parity error in the high register). Thus by choosing a code, such as the binary-coded decimal (BCD) which always provided at least one "1" bit in each character, and by specifying an even-redundancy check bit, there would always be at least two bits in each byte. Statistically the chance of having both bits marginal (in a minimal two bit byte) is so extremely remote as to be negligible, even with respect to the extremely high standard of reliability for digital data computer systems.

On the other hand, when a pure binary code is specified for recording on tape, it is possible to have data bits that are all zeros. In such case odd redundancy must be used with NRZI recording to insure at least one "1" bit in a byte for clock actuation so that the system can recognize the existence of an all zero data group. With odd parity the check bit is a "1" when the data bits are all zeros. Also with odd parity, a binary group of data bits having only one "1" bit will have a "0" check bit, which (like the all zeros group with odd parity) results in having only one "1" bit in the byte. With pure binary coding, both the all zeros data group, as well as the data group with a single "1" bit, is very common. Accordingly, the statistical chance of losing the single "1" bit, and thereby losing a byte due to lack of a "character gate" (clock actuation) is relatively high in NRZI binary tape systems, so that the reliability of such systems may thereby be reduced below the point desired for a digital computing system. Such is the case if the single bit in such byte becomes marginal, since in the prior system the read clock ("character gate" circuit) failed to be actuated with the consequence that the character was lost, even though it may have been registered in the "low register," while reading, but not writing, tape.

The present invention is directed to the latter problem, and provides means for actuating the byte clock (providing a "byte cycle" or "character gate") with the "low register" when a byte is marginal. This invention restricts the use of the "low register" for actuating a read clock cycle. The restricted use must occur within a short period of time controlled by the preceding byte, so that false triggering of the "low register" by random noise will not cause a false "character gate," which may transfer a false byte. Consequently, the present invention greatly increases the reliability of magnetic tape systems reading recorded binary data.

This invention provides means for utilizing the "high register" to generate a "next-byte signal" that starts approximately one-bit period after the occurrence of the first sensed bit of each byte in the "high register." This "next-byte signal" extends into the period of the next byte, and exists at least to the last possible bit of the next byte (assuming maximum skew). If the next byte is marginal, it causes a "marginal-byte signal" ("bit noncompare signal") from the compare circuit in the system. The simultaneous occurrence of the "marginal-byte signal" and the "next-byte signal" causes a "substitute clock cycle" (resulting in a substitute "character gate"), which transfers the data byte from the "low register" (due to the obvious error in the "high register"). The "substitute clock cycle" can also be used to terminate the "next-byte signal," so that later noise in the "high register" during the remaining part of the byte period cannot actuate a false clock cycle. The "substitute clock cycle" also causes generation of another "next-byte signal" into the period of the next following byte. And if the next following byte is marginal, it can also cause a substitute clock cycle into the next succeeding byte period, and so on. In this manner, any number of bytes in a sequence of marginal bytes (following a byte with a good-amplitude bit) can each generate a respective "substitute clock cycle," except the first byte of a data block. The first byte of a block may be controlled to have at least two "1" bits, such as by specifying it to be a special character like a "blank" character.

The foregoing and other objects, features and advantages of the invention will be apparent from the following more particular description of the preferred embodiments of the invention, as illustrated in the accompanying drawings.

Figure 3:
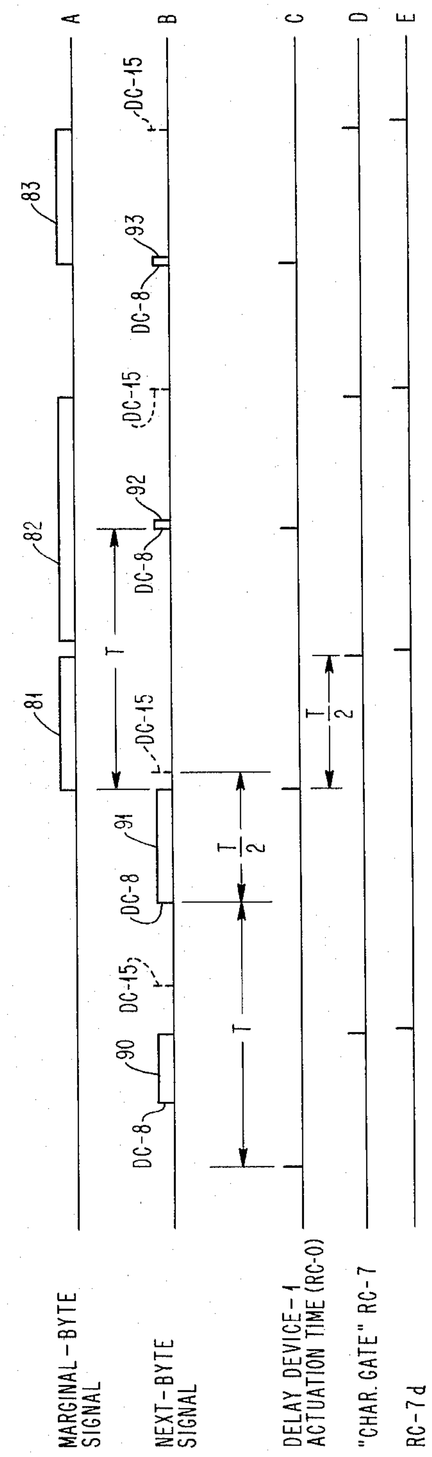
Figure 4:
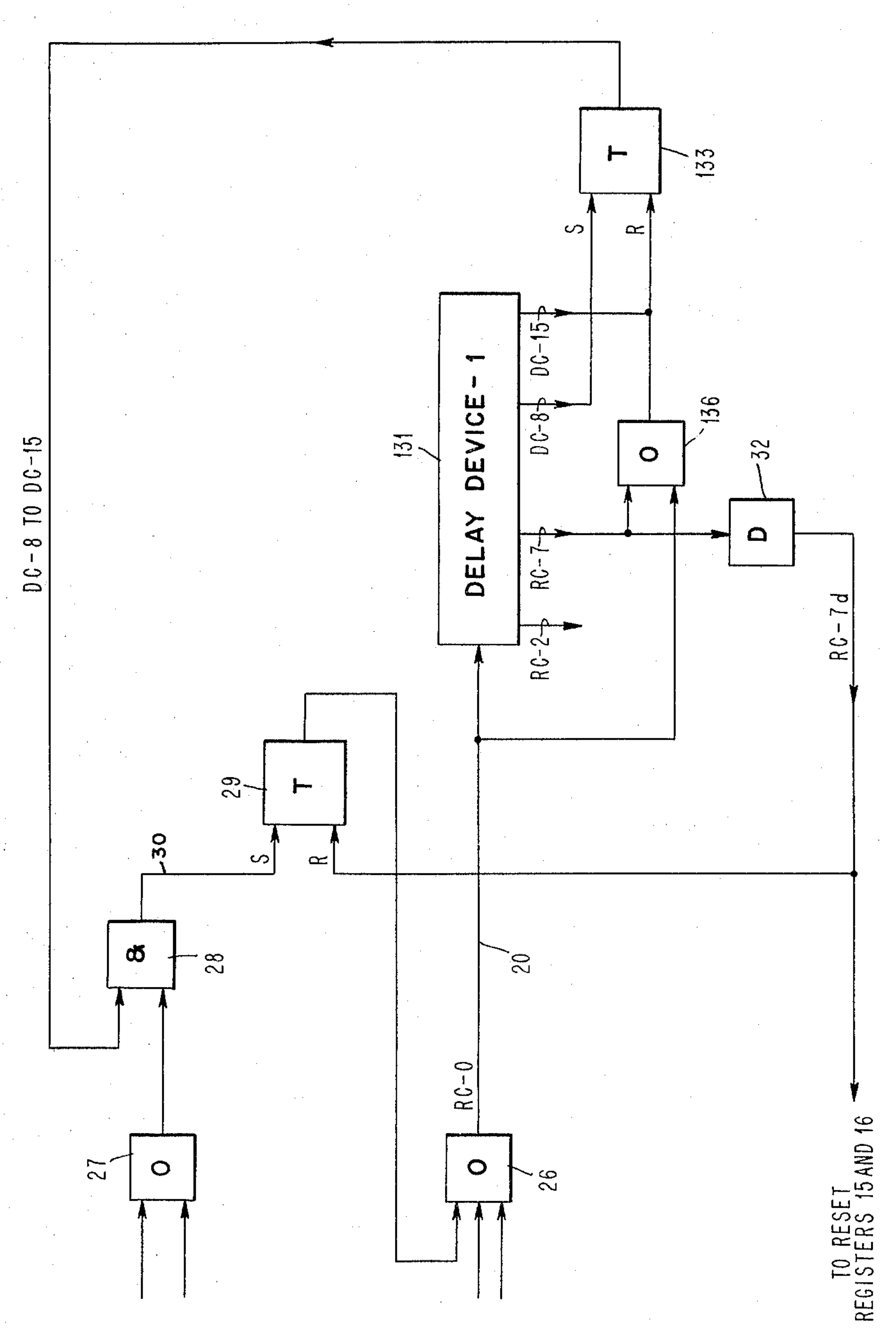

FIGURES 3A, B, C, D and E illustrate waveforms representing the operation of the invention; and FIGURE 4 shows a second embodiment of the invention.

Figure 1:
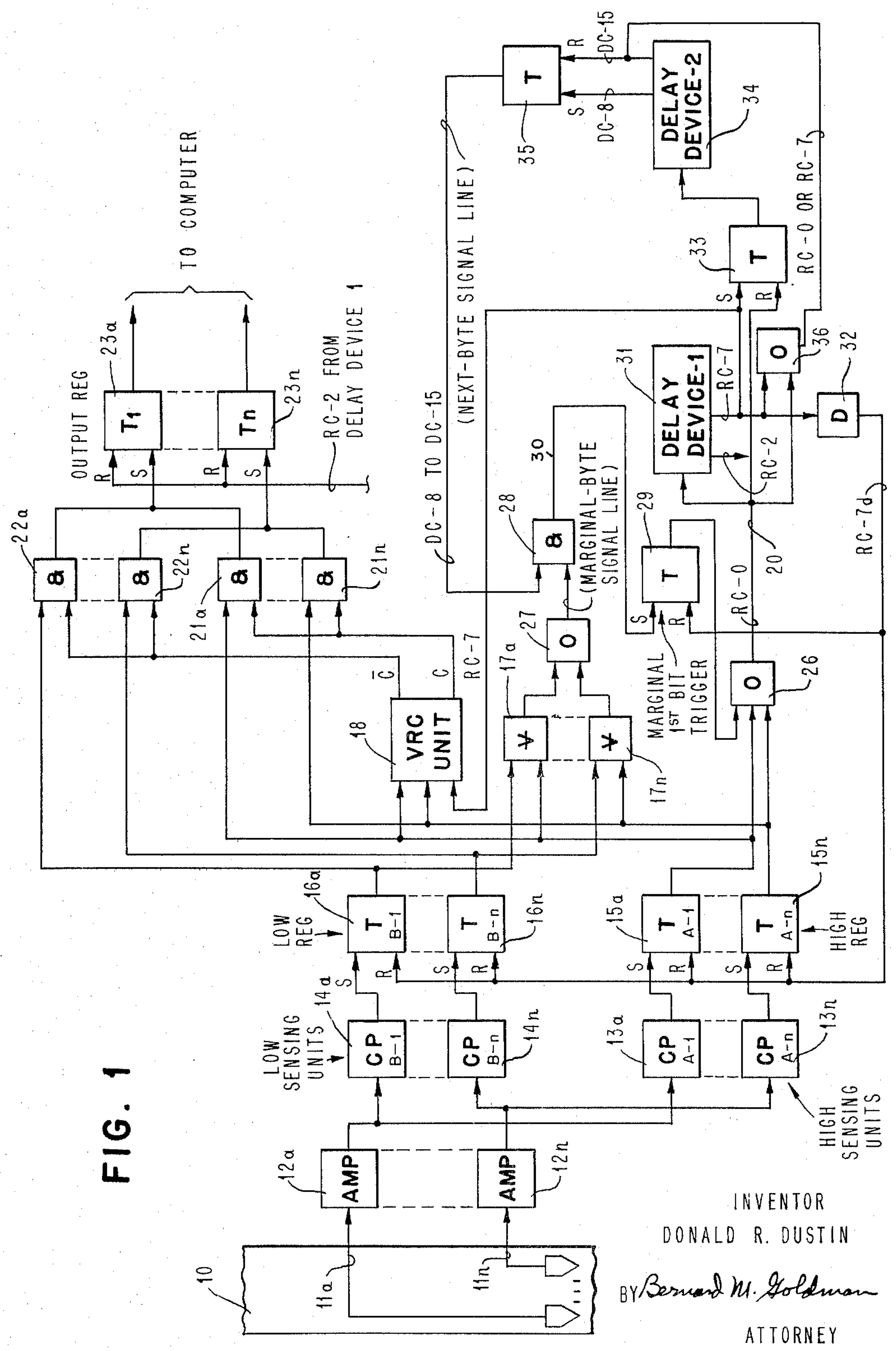
FIGURE 1 shows a block-diagrammed circuit that includes an embodiment of the invention.

The circuit in FIGURE 1 is next considered. The transmission of data in FIGURE 1 on lines 11*a–n* are derived from a magnetic tape 10 by a plurality of heads respectively connected to inputs of transmission lines 11*a–n*. However, it is understood herein that transmission lines 11*a*–n may receive data from any source providing data bits in parallel binary-digit form.

A plurality of amplifiers 12*a–n* respectively receive and amplify the data bits provided from respective transmission lines 11*a–n*. Each of amplifiers 12*a–n* provides two parallel outputs, one to a "high" sensing unit 13 and the other to a "low" sensing unit 14. Thus high sensing unit 13*a–n* receives outputs from all amplifiers 12*a–n*; and likewise low sensing units 14*a–n* also receive outputs from all of amplifiers 12*a–n*. Consequently, sensing units 13 and 14 should normally receive identical sets of information bits from transmission lines 11*a–n*. Each of sensing units 13 and 14 is a base clipper, which removes a lower part of each received pulse and transmits only the upper remaining part above a predetermined clipping level in the manner described in the above cited patent application Serial No. 671,834, filed July 15, 1957. High sensing unit 13 clips at a relatively high level, while low sensing unit 14 clips at a relatively low level. Thus the data bit pulses provided from the output of high sensing unit 13 will have less amplitude than the same data pulses provided from the output of sensing unit 14. The clipping level of unit 13 is set high enough that almost all of the received low-level noise (such as normally results from a tape surface) will be removed and not transmitted from unit 13, so that its output is basically representative of data received on lines 11*a–n*.

Trigger registers 15*a–n* and 16*a–n* receive the respective outputs of sensing units 13 and 14. However, the registering of such data by the triggers of "high register" 15*a–n* is predicated upon the clipped pulses representing the data bits having sufficiently high amplitude. If the received data bits have marginal amplitude, they will not set register 15.

On the other hand, the amplitude of pulses from low sensing unit 14 can set the triggers of register 16 during marginal amplitude input conditions: But the low clipping level of unit 14 can also pass high level noise during normal input amplitude conditions on lines 11*a–n*, so that register 16 is more subject to false triggering by noise than is register 15.

Consequently, during normal signal input level conditions, high register 15 will accept a more accurate rendition of the received data than will low register 16, because register 16 is more apt to be falsely actuated by noise pulses occurring while data is being received.

On the other hand, if the amplitude level of any data bit received on transmission lines 11*a–n* should fall below a normally required level to a marginal level (that will not set register 15) register 16 is far more likely in those instances to represent the data accurately.

An output register 23 normally receives the output of high register 15. A vertical redundancy check (VRC) unit 18 determines the parity accuracy of the data in register 15 and selects which of registers 15 or 16 is to transfer a byte to register 23. If a parity error exists with respect to the information in register 15, the data in register 16 is transferred instead to register 23.

VRC unit 18 has inputs respectively connected to the outputs of each of triggers 15*a–n*. Complementary outputs $\overline{C}$ and C are provided from the output of VRC unit 18. These outputs are used to determine which register 15 or 16 transfers the byte into register 23 by using one of two sets of AND gates 21*a–n* or 22*a–n*. AND gates 21*a–n* have inputs respectively connected to outputs of triggers 15*a–n*. Likewise AND gates 22*a–n* have inputs respectively connected to the outputs of triggers 16*a–n*. Each of the gates in 21*a–n* has an input connected to output C of unit 18. In the like manner, each of the AND gates 22*a–n* has an input connected to output $\overline{C}$ of unit 18. If VRC unit 18 does not indicate an error, its output C enables gates 21*a–n* and outputs $\overline{C}$ disables 22*a–n*. On the other hand, an error indication from unit 18 causes gates 22*a–n* to be enabled, and gates 21*a–n* to be disabled.

However, any transfer of a byte from either register 15 or register 16 must await a "character gate" (read-clock cycle) RC–7 derived from a delay device 31 (which is often called a "read clock" in a tape control unit) which is actuated normally by the first bit into register 15 of each received byte. The first bit registered by any of triggers 15*a–n* results in the trigger output being provided through an OR gate 26 to the input of delay device 31 at an actuation time called RC–0, in response to which the delay pulse RC–7 (the "character gate") is generated. Once any of the triggers 15*a–n* is set by a first bit of a byte at RC–0, the actuation of any other triggers, 15*a–n* by a later skewed bit in the same byte cannot affect the output of OR gate 26 which had previously been brought up by the first of triggers 15*a–n* to be actuated, which remains up until all of the triggers are reset by output pulse RC–7*d*, which is RC–7 delayed slightly by a delay device 32. After each first bit actuates delay device 31 at RC–0, it provides a sequence of outputs (including RC–7) that are time-delayed by a fixed amount from the actuation by the first bit. Thus delayed pulses RC–2, and RC–7 are sequentially provided at respectively later times from the instant of actuation RC–0.

Particular circuits for delay device 31 (known as a "byte cycle generator," "read clock" or "character gate") are well known in the art and have been publically used in commercial systems for several years prior to the filling of this application. (For example, such delay device has been comprised of single-shot multivibrators to obtain the particular delayed pulses, it has been provided by binary and ring counter arrangements driven by a burst of oscillator pulses having a predetermined frequency with the oscillator pulses being stopped upon the counter reaching a particular count; and it has been provided by a delay-line.)

Likewise, the vertical redundancy check unit 18 is well known in the art and has been commercially used for several years, prior to the filing of this application. (For example, a preferable arrangement is the use of an Exclusive-OR gate tree which obtains a simultaneous modulo-two summation of its inputs. Each output of the Exclusive-OR tree is passed through an AND gate for sampling the output with RC–7 obtained from delay device 31. Also vertical redundancy check units have been made by using a single binary trigger with a gating arrangement so that parallel provided inputs are sampled sequentially to actuate the binary trigger to obtain a modulo-two summation over the bits of a character.)

A compare circuit comprising Exclusive-OR gates 17*a–n* compares the corresponding bits registered in 15 and 16 and provides a "marginal-byte signal" upon a noncompare. A noncompare output was used by prior systems to actuate a "character gate" only for a character being read while tape was being recorded. During read-while-write conditions, any false-error indication by the compare circuit was of no great consequence, since it would ultimately result in that block of data being erased and written so that an error-free writing operation is assured. With tape unit outputs, compare circuit 17 may be comprised of AND gates substituted for Exclusive-OR gates 17*a–n*, because only dropout errors have been found to be important in most tape installations. Each Exclusive-OR gate 17 has two inputs which connect respectively to corresponding trigger outputs of registers 15 and 16. For example, gate 17*a* will have inputs connected to the outputs of triggers 15*a* and 16*a*, and so on until gate 17*n* has its inputs provided from outputs of triggers 15*n* and 16*n*. The outputs of all Exclusive-OR gates 17*a–n* are provided through an OR gate 27. In prior systems the output of OR gate 27 is provided as an input to OR gate 26 only for the read checking while writing tape, wherein a read head follows shortly behind a write head. Any error read while writing caused the block to be erased and rewritten. Thus a false character cycle due to noise causing a rewriting was of no great consequence. But during read only operations, the marginal-byte output of compare circuit 17 was not used to gate the clock in prior systems (because of the posibility of low register 16 being actuated by noise which would cause a transfer of a possible non-existent byte, which could not be remedied as could be done wnen writing tape).

The skewed bits of each byte being received from NRZI tape not having a clock track should be received within one-half a bit period T. Thus the delay of pulse RC–7 from the actuation of delay device 31 should not be greater than *T*/2, where T is the period between bits received on one of transmission lines 11*a–n* during reception of a block of data. Since the data byte in register 15 or 16 is sampled at time RC–7 from the first bit of the byte, all bits of the byte must be registered by RC–7. The transfer of the byte from register 15 or 16 into output register 23 should be without skew due to the common gating of all bits of the byte by pulse RC–7. During the next cycle of delay device 31 in response to the next received byte, output register 23 is reset by pulse RC–2 prior to the transfer of the next byte from register 15 or 16 by later pulse RC–7. Between RC–7 and the next RC–2, while the data is in output register 23, a demand signal is provided to a computer or other receiving buffer (by means not shown) so that the data in register 23 is transmitted during that interval to the computer.

Immediately after the output of register 15 or 16 is sampled by RC–7, the registers 15 and 16 are reset by RC–7*d*.

The portion of FIGURE 1 described above in detail in this specification is old in the art, but has been described for the necessary purpose of enabling one skilled in the art to understand the operation of the following novel embodiments shown in FIGURES 1 and 4.

In FIGURE 1 a second delay device 34 is provided which may be a device constructed in the same manner as delay device 31. Device 34 may be part of or similar to the device which ordinarily is used to recognize the end of a block of received data bytes. (Thus device 34 may be comprised of single-shot delays, an oscillator driven counter or ring arrangement or a delay line arrangement, which are types previously known and used by persons skilled in the art.)

Delay device 34 is started and stopped by the output of a trigger 33, which is controlled by delay device 31. A set input of trigger 33 is actuated by "character gate" RC–7 and a reset input is provided by actuation of any earlier input or output of delay device 31, such as at time RC–0. Since RC–0 occurs before RC–7, the resetting by RC–0 is not available until the next actuation of device 31 by the next received byte. Accordingly, delay device 34 is not actuated until delay device 31 provides RC–7, and then device 34 continues to operate until trigger 33 is reset. Hence second delay device 34 will be continually reset by each next byte within the body of a block being received.

After delay device 34 is actuated by RC–7, it eventually provides an output DC–8 which is time delayed by approximately a bit period T after actuation time RC–0 for delay device 31. A next output DC–15 occurs not later than *T*/2 after DC–8.

A "next-byte signal" is provided by a trigger 35 between its set and reset times DC–8 and DC–15, which must start and end during some bit of the next byte. In this manner, some part of the "next byte signal" must exist at the time of the latest possible bit of the next byte. For this reason the start time DC–8 of the "next byte signal" is a bit period period T from the beginning of actuation of RC–0 of first delay device 31.

An AND gate 28 receives both the 'next byte signal" on the lead from trigger 35 and any "marginal-byte signal" from OR gate 27. If during the next byte period, any bit of that byte is below an amplitude sufficient to actuate register 15, but actuates register 16, a "marginal-byte (noncompare) signal" from gate 27 will be started by that bit. Also, the last possible bit position of any byte is the last conceivable time that a "marginal-byte signal" can begin. For this reason the "next-byte signal" starting at DC–8 should be allowed to exist until the last possible bit position of the next byte unless an an earlier bit has actuated delay device 31.

An AND gate 28 provides an output that can actuate a trigger 29 whenever one of the "next-byte signal" or the "marginal byte signal" occurs during the existence of the other.

As a result, AND gate 28 provides an output at some time during the occurrence of the next marginal character (between DC–8 and DC–15) to actuate delay device 31 and obtain a clock cycle.

Hence the output of trigger 29 through OR-gate 26 establishes a time RC–0 to cause a byte cycle from first delay device 31, that results in a normal cycle from second delay device, which can enable the system for the next succeeding marginal byte, etc.

While a full "next-byte signal" pulse from DC–8 to DC–15 can be provided during each next byte, it is preferable that the "next-byte signal" pulse starting at DC–8 be terminated as early as possible after an actuation of first delay device 31, in order to eliminate the risk of noise actuating an early clock cycle for the next byte during any part of the "next-byte signal" which in particular might follow the character gate, RC–7. Thus, it is preferable if both the initial actuation RC–0 and "character gate" RC–7 of first delay device 31 be used to reset trigger 35 or otherwise terminate the pulse on lead 30 at that time. In FIGURE 1, all outputs from delay device 31 terminate by reset of trigger 29; and all outputs from delay device 34 terminate by reset of trigger 33.

A second embodiment of the invention is shown in FIGURE 4. In essence, it replaces delay devices 31 and 34 of FIGURE 1 with a single delay device 131. The gates 26, 27 and 28, trigger 29, and leads 20 and 30 are the same as found in FIGURE 1; and the inputs to OR-gates 26 and 27 are derived in FIGURE 4 from the same circuitry providing their inputs in FIGURE 1. Delay device 131 is actuated by RC–0 and provides the same outputs RC–2, RC–7, DC–8 and DC–15 at the same relative times described for FIGURE 1.

A trigger 133 provides a "next-byte signal" output that is started at DC–8 (when set) and is stopped at the earliest of RC–0, RC–7 or DC–15. Accordingly, the maximum duration for this next-byte signal is $T/2$ between DC–8 and DC–15. If a bit in register 15 should start a clock actuation shortly before DC–8, then the "next-byte signal" is terminated by RC–7; but if a first bit in register 15 occurs after DC–8, the RC–0 actuation ends the "next-byte signal." On the other hand, if a "marginal-byte signal" is in existence when DC–8 starts a "next-byte signal," it causes an actuation RC–0 which terminates the "next-byte signal" almost as soon as it begins.

The optimum delay for pulse DC–8 is a bit period T after the actuation of delay device 31 or 131 by an output from OR gate 26 at time RC–0. If the delay of DC–8 is less than T it may make the system subject to an early clock actuation by a noise triggering of register 16, which may result in a sampling of the next byte before all of its skewed bits may have arrived. On the other hand if the delay of DC–8 is greater than bit period T, no difficulty is encountered when the "next-byte signal" is terminated by RC–0 or RC–7 of the next-byte clock cycle, in regard to noise actuation.

The provision of a maximum "next-byte signal" over $T/2$ between DC–8 and DC–15 is where the maximum skew anticipated is one-half bit period. If, however, less skew than $T/2$ is anticipated, the spacing between DC–8 and DC–15 can be correspondingly less; and if in fact no skew is expected only a very short sampling pulse need be provided at DC–8. Where reset pulse RC–0 and/or RC–7 are used to end the "next-byte signal," the reset pulse DC–15 does not enter into the operation of the system with marginal bytes, since reset must occur before DC–15. However, after the last byte of a block, the "next-byte signal" is terminated by DC–15. Since the system is subject to a false noise actuated clock cycle during this last next-byte signal, a special "end-of-block byte" can be used as the last byte of a block to disable the delay devices by means not shown. However, this may not be necessary since the noise level drops considerably outside data areas.

Figure 2:
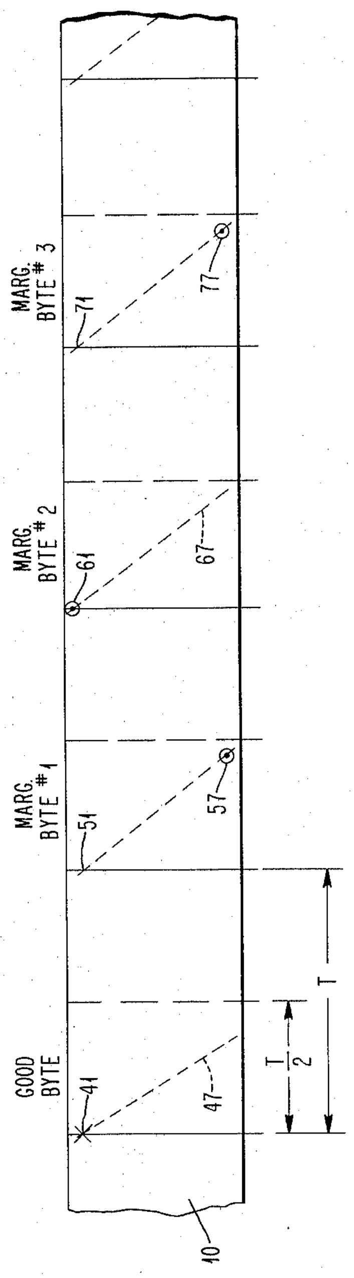
FIGURE 2 illustrates a sequence of bytes of data as they may be recorded on the surface of magnetic tape.

The operation of the circuit in FIGURES 1 and 4 will next be considered with respect to FIGURES 2 and 3.

FIGURE 2 illustrates the time relationship between the bits transmitted from a plurality of channels recorded on tape in a skewed manner represented by the skewed bit positions of four bytes 41–47, 51–57, 61–67 and 71–77. The illustrated four groups of bit positions represent the possible locations for "1" bits in each of four successive bytes within a data block. It is further assumed in FIGURE 2 that only a single "1" bit position in each byte is represented by a pulse, hereafter called a "1" bit. Hence, the remaining six bit positions in each byte is represented by the absence of a pulse, and is designated a "0" bit. One pulse per byte represents a worst case condition during the transmission of binary data with odd parity. But of course there may be any number of "1" bits in a byte up to its maximum number of bit positions.

The first occurring byte on the left side of FIGURE 2 is designated a good" byte because its single "1'- bit 41 (designated with an X) has sufficient amplitude to actuate triggers in both the registers 15 and 16. However, the following three bytes in FIGURE 2 are designated as "marginal" bytes, because the single "1" bit of each (designated with a circle) provides a pulse with insufficient amplitude to actuate any trigger in register 15, but the pulse has sufficient amplitude to actuate a trigger in register 16 due to the lower clipping level. The bit positions in any one channel (or tape track) occur at substantially equally-spaced bit periods T. However, a "1" bit in any byte can occur in any of its bit positions, since this is a data coding function. Consequently, the "1" bit may vary in its time position between the earliest and latest bit positions of a skewed byte. It is assumed in this description that the skew of a byte cannot exceed one-half of the bit period T, but that the skew can vary by any amount between 0 and $T/2$. Hence for single "1" bit bytes, it is possible for the time between "1" bits of adjacent bytes in different channels to vary in their time spacing between $T/2$ and $3T/2$. Since first delay device 31 is normally actuated by the first bit of a byte in register 15, the time spacing between its actuations can vary between $T/2$ and $3T/2$, due to skew. Accordingly, if a byte is skewed, delay device 31 can be actuated at varying times depending upon the amount of skew and the location within the byte of its first bit. (If there were no skew, device 31 would normally be actuated with time spacing T.)

Furthermore, the "character gate" RC–7 output of delay device 31 will correspondingly occur at no greater than $T/2$ after each actuation of register 15, since RC–7 must wait until all of the skewed bits of its actuating byte have registered. Also RC–7 must occur early enough before the first bit of the next byte to allow reset of registers 15 and 16 in preparation for the first bit of the next byte. The register reset time reduces the maximum tolerable skew to slightly less than $T/2$, but this is well known in the art and is neglected herein to simplify the description of the invention. Hence it is understood herein that the defined limiting times can vary by the reset times of registers 15 and 16.

FIGURE 3C represents the time of actuation, RC–0, for first delay device 31, which should occur upon the first bit of each byte being received. FIGURE 3D represents the resulting "character gate" output RC–7 of delay device 31 that follows its actuation by $T/2$. FIGURE 3E illustrates RC–7*d* which results from pulse RC–7 actuating delay means 32 which has a very short delay time compared to period T. It is at RC–7 that the output of register 15 or 16 is sampled to transmit the received byte to output register 23; and registers 15 and 16 are reset very shortly thereafter by pulse RC–7*d* to prepare registers 15 and 16 for receiving the next byte.

In FIGURE 2 it is assumed that bit 41 of the first byte has sufficient amplitude to actuate both registers 15 and 16. Hence there is no "marginal-byte signal" in FIGURE 2A provided in response to any bit of the "good" byte. Therefore, AND gate 28 in either FIGURE 1 or 4 is not enabled by any "noncompare signal," although a next-byte signal 90 is provided during part of the period of the "good" byte, in response to a prior byte (not shown). (If byte 41–47 were the first byte of a block, no "next-byte signal" would occur during its period.)

Since the bit 57 of the following byte has marginal amplitude, it sets a trigger in register 16 but no trigger in register 15, so that a "marginal-byte signal" 81 is started upon the occurrence of bit 57: In response to prior bit 41, delay device 34 (or 131) and trigger 35 (or 133) provide an output 91 beginning at DC–8, which is time T after prior actuating bit 41. The first bit of the marginal byte is located in its latest bit position 57, which occurs just before signal 91 would be terminated by DC–15. The start of signal 81 actuates AND gate 28, which previously was receiving signal 91, to set trigger 29 and provide an actuating input RC–0 to delay device 31 (or 131). Signal 91 is also terminated by the same RC–0, which resets triggers 33 and 35 (or 133).

Hence delay device 31 responsively provides a "character gate" RC–7 which transfers the byte through gates 22*a–n*; because there will be a parity check indication in register 15 at time RC–7, since no bit is then in register 15 and odd parity is expected.

The new actuation RC–0 of delay device 31 resulting from bit 57 causes a new "next-byte signal" 92 starting during the reception of the next byte 61–67 before the end of its last possible bit position, due to signal 92 starting a time T after RC–0 caused by bit 57.

Consequently when the bit 61 of next byte 61–67 is marginal, it starts a "marginal-byte signal" 82 into AND gate 28. Hence when "next-byte signal" 92 begins, it causes an output through gate 28 to set trigger 29 and cause an actuating input RC–0 to delay device 31 (or 131). This RC–0 immediately causes a termination of signal 92, and sequentially causes a "character gate" RC–7 that transfers byte 61–67 to register 23, sets in motion the start of another "next-byte signal" 93 during the reception of the next byte 71–77.

Since bit 77 of the next byte 71–77 is also marginal, it starts a "marginal-byte signal" 83. The "next-byte signal" 93 starts shortly after signal 83; and an RC–0 actuation results to start delay device 31 (or 131) and to terminate signal 93.

If byte 71–77 were the last byte of a data block, there would be no next character to register in 15 or 16; and there would not be any actuation of delay device 31 (or 131) or of any (noncompare) "marginal-byte signal." Nevertheless, a "next-byte signal" (not shown) would begin at an interval T after the first bit of the last character. This last "next-byte signal" would be terminated by DC–15, since there would not be any RC–0 or RC–7 to terminate it.

The position of time DC–8 from RC–0 will be affected by any time variation in the bit period T. Period T can vary slightly due to variation in an oscillator frequency controlling the writing operation of a tape, and will vary with any capstan speed variation while writing or reading the tape. It has been found preferable if the relationships of DC–8 and DC–15 to RC–0 are based on the nominal value of T expected in normal operation. It is preferable that DC–8 not occur less than nominal T after RC–0 to prevent possible early false actuation of delay means 31 by noise in low register 16 when normal multi-bit bytes are actuating high register 15.

An important reason for having DC–8 equal to the actual T from RC–0 is to prevent a possible creep in the sampling by RC–7 of successive marginal bytes. If the occurrence after RC–0 of DC–8 is greater than the actual T, then after a last-bit type of byte (such as 57) in a sequence of marginal bytes, the start of each following "next-byte signal" will occur later and later until it will eventually skip a byte period and lose a byte, if the marginal sequence should continue beyond a number of characters depending upon how much greater the DC–8 period is than the actual T.

On the other hand, if the spacing between RC–0 and DC–8 is less than the actual T, no difficulty is encountered due to creep for clocking successive marginal bytes. However, the difficulty stated above may be encountered. However, if the "next-byte signal" occurs much less than T after RC–0, then a possibility also exists of the "next-byte signal" being terminated by RC–7 of the prior byte, making the "next-byte signal" unavailable for the next byte. Hence, ideally T should be equal to the actual T expected during normal operation.

While the "next-byte signal" has been shown as a direct-current level starting at time DC–8, it can also be provided by a burst of one or more pulses at and after DC–8 but not later than DC–15.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for selectively causing a substitute byte cycle with a marginal data byte, with means for sensing the existence of a marginal data byte to provide a marginal-byte signal therefrom, comprising delay means being actuated by a received byte, means for generating a next-byte signal in response to an actuation of said delay means, said next-byte signal beginning approximately one bit period after said actuation and terminating before approximately one and one-half bit periods after said actuation, and means for actuating a substitute byte cycle in response to an occurrence of any part of said marginal-signal output simultaneously with any part of said next-byte signal.

2. A system for generating a substitute "character gate" for a marginal byte from a delay means that normally generates a "character gate" in response to a normal byte, and means for providing a marginal-signal output in response to a marginal byte, comprising AND gate means for receiving said marginal-byte signal output, said delay means providing a next-byte signal delayed by approximately a bit period after an actuating input to said delay means, said next-byte signal being terminated before approximately one and one-half bit periods after said actuating input, means connecting said next-byte signal to said AND gate means, and means for actuating said delay means in response to an output from said AND gate means to provide a substitute "character gate."

3. A system for generating a substitute "character gate" from a delay means that normally generates a "character gate" in response to the first bit of a normal byte, and means for sensing less than normal bytes to provide a marginal-byte output, comprising a next-byte signal being provided from said delay means, the start of said next-byte signal being delayed from the actuation of said delay means by approximately a bit period, said next-byte signal being terminated before approximately one and one-half bit periods after said actuation, AND gate means receiving said next-byte signal and said marginal-byte output, information retention means being set by an output of said AND gate means, the output of said retention means actuating said delay device to generate a substitute "character gate,"

and an output of said delay means resetting said retention means.

4. A system for generating a substitute "character gate" from a delay means that normally provides a "character gate" in response to the first bit of a normal byte, and means for sensing less than normal bytes to provide a marginal-byte output, comprising AND gate means for receiving said marginal-byte output, said delay means providing an output delayed approximately one bit period after any actuation, a bistable means generating a next-byte signal in response to said delayed output, said AND gate means also receiving said next-byte signal, and means for actuating said delay means in response to an output of said AND gate means to provide a substitute "character gate."

5. A system as defined in claim 4 in which said bistable means is reset in response to an actuation of said delay device.

6. In a system for generating a substitute "byte cycle" from a first delay means that normally provides a "byte cycle" in response to the first bit of a normal byte, and means for sensing less than normal bytes to provide a marginal-byte output, comprising AND gate means for receiving said marginal-byte output, second delay means being actuated by an output of said first delay means and being deactuated by an earlier output of said first delay means responsive to a next-byte, an output of said second delay means being provided at approximately a bit period from the actuation of said first delay means, means providing an input to said AND gate in response to said output of said second delay means, and said input to said AND gate means being terminated in response to an output from said AND gate means.

7. A system for generating a substitute "byte cycle" from a delay means that normally provides a "byte cycle" in response to the first bit of a normal byte, and means for sensing less than normal bytes to provide a marginal-byte output, comprising AND gate means for receiving said "marginal-byte output,"

second delay means, a control bistable means providing an output for actuating said second delay means, said control bistable means being set in response to an output of said first delay means and being reset in response to an earlier output ofsaid first delay means, a next-byte-signal bistable means being set in response to an output of said second delay means occurring approximately a bit period after the actuation of said first delay means, and being reset in response to reset of said next-byte-signal bistable means, a marginal-byte bistable means being set in response to an output of said AND gate means, and means connecting the output of said marginal-byte bistable means to said first delay means to actuate a substitute "byte cycle" from said first delay means.

8. A system for generating a substitute "character gate" from a delay means normally providing a "character gate" in response to the first bit of a byte received by a normal-clip input register, with a higher-clip input register also receiving said byte, and a compare means provides a compare or noncompare output in response to a bit comparison of a byte registration in said registers, comprising AND gate means for receiving said compare or noncompare output, a next-byte-signal bistable means being set in response to an output of said delay means occurring approximately a bit period after actuation of said delay means, said next-byte-signal bistable means being reset in response to an output of said delay means having a lesser delay than said setting output, an output of said next-byte-signal bistable means being provided as an input to said AND gate means, and activating means connecting the output of said AND gate means to the input of said delay means to actuate it.

9. A system as defined in claim 8 in which said actuating means is a bistable device being set by an output of said AND gate and being reset by any output of said delay device earlier than said setting output.

10. A system as defined in claim 8 in which said next-byte-signal bistable means is reset in response to the actuation of the "character gate" output of said bistable device.

11. Means for generating a substitute "clock cycle," including a low-clip register which has received a marginal-amplitude byte, that was not received by a high-clip register arranged to receive said byte in parallel with said low-clip register, and means for comparing the bit outputs of said registers to provide when appropriate, a "noncompare signal," a first delay means normally actuated into a clock cycle by the first bit of each byte received by said high-clip register, said first delay means providing a pulse for sampling one of said registers not later than one-half bit period after reception of said first bit, with the register sampled depending on a parity error indication, comprising second delay means for providing a "next-byte-signal" between slightly less than one bit period and not over one and one-half bit periods after actuation of said first delay means, means for resetting each of said first and second delay means in response to the sampling pulse, means for actuating said first delay means into a substitute "clock cycle" with the coincidence of any parts of said "noncompare signal" and said "next-byte-signal" when said first delay means has not been actuated by any prior bit of a byte being received.

References Cited by the Examiner

UNITED STATES PATENTS

| | | | |
|---|---|---|---|
| 2,687,473 | 8/1954 | Eckert et al. | 328—94 |
| 2,830,179 | 4/1958 | Stennings | 328—94 |
| 2,975,407 | 3/1961 | O'Brien | 340—174.1 |

ARTHUR GAUSS, *Primary Examiner.*